(12) United States Patent
Yamaguchi

(10) Patent No.: US 11,430,204 B2
(45) Date of Patent: Aug. 30, 2022

(54) INFORMATION PROCESSING DEVICE, INFORMATION PROCESSING METHOD, AND PROGRAM

(71) Applicant: SONY CORPORATION, Tokyo (JP)

(72) Inventor: Yuya Yamaguchi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 73 days.

(21) Appl. No.: 16/971,114

(22) PCT Filed: Feb. 12, 2019

(86) PCT No.: PCT/JP2019/004790
§ 371 (c)(1),
(2) Date: Aug. 19, 2020

(87) PCT Pub. No.: WO2019/163576
PCT Pub. Date: Sep. 29, 2019

(65) Prior Publication Data
US 2021/0012142 A1  Jan. 14, 2021

(30) Foreign Application Priority Data
Feb. 26, 2018 (JP) .............................. JP2018-032150

(51) Int. Cl.
*G06V 10/44* (2022.01)
*H04N 5/235* (2006.01)
(Continued)

(52) U.S. Cl.
CPC ............ *G06V 10/443* (2022.01); *G06V 10/56* (2022.01); *G06V 10/60* (2022.01); *H04N 5/2353* (2013.01)

(58) Field of Classification Search
CPC .. G06K 9/4609; G06K 9/4652; G06K 9/4661; G06K 9/00664; G06K 9/4604;
(Continued)

(56) References Cited

U.S. PATENT DOCUMENTS 7,227,586 B2 * 6/2007 Finlayson ............ G06K 9/4652
348/223.1
9,240,049 B2 * 1/2016 Ciurea ................. H04N 13/243
(Continued)

FOREIGN PATENT DOCUMENTS

EP       3438925 A1    2/2019
JP    2007-074163 A    3/2007
(Continued)

OTHER PUBLICATIONS

Nuske et al., Robust Outdoor Visual Localization Using a Three-Dimensional-Edge Map, Journal of Field Robotics, Sep. 2009, pp. 728-756.

*Primary Examiner* — Ali Bayat
(74) *Attorney, Agent, or Firm* — Paratus Law Group, PLLC

(57) ABSTRACT

There is provided an information processing device, an information processing method, and a program that make it possible to provide proper exposure control of a captured image. A matching section matches a feature point extracted from a captured image against a registered feature point stored in a predetermined storage section, and extracts a corresponding feature point in the captured image that corresponds to the registered feature point. A control section sets an exposure control value in accordance with an area image that is the image of an area near the corresponding feature point in the captured image. The present technology is applicable, for example, to an exposure control device that provides exposure control of a camera mounted on a mobile body.

12 Claims, 4 Drawing Sheets

(51) Int. Cl.
*G06V 10/56* (2022.01)
*G06V 10/60* (2022.01)

(58) Field of Classification Search
CPC .... H04N 5/2353; H04N 5/2351; H04N 5/235; G06T 2207/20021; G06T 2207/30168; G06T 2207/30244; G06T 7/579; G03B 7/091; G03B 15/00
USPC .......................................................... 382/199
See application file for complete search history.

(56) References Cited

U.S. PATENT DOCUMENTS

| | | | |
|---|---|---|---|
| 2011/0096093 A1 | 4/2011 | Ol et al. | |
| 2012/0294527 A1* | 11/2012 | Lukac | H04N 9/646 382/167 |
| 2015/0312473 A1* | 10/2015 | Nozaki | H04N 5/232125 348/222.1 |
| 2016/0360167 A1* | 12/2016 | Mitchell | H04N 9/3194 |
| 2017/0018231 A1* | 1/2017 | Liu | G09G 3/3426 |
| 2017/0302838 A1 | 10/2017 | Yang et al. | |

FOREIGN PATENT DOCUMENTS

| | | |
|---|---|---|
| JP | 2007-282119 A | 10/2007 |
| JP | 2009-239792 A | 10/2009 |
| JP | 2017-134617 A | 8/2017 |

\* cited by examiner

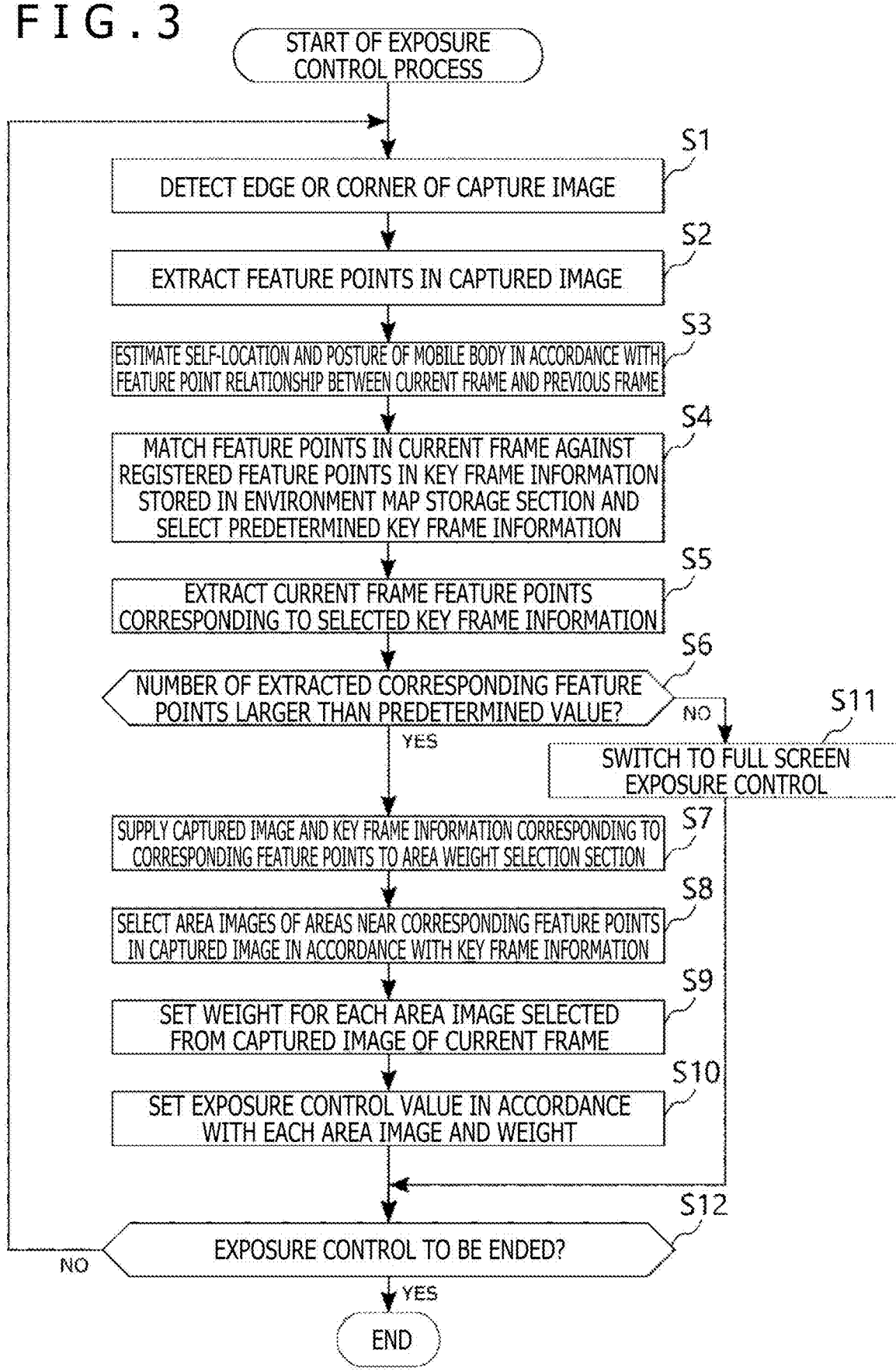

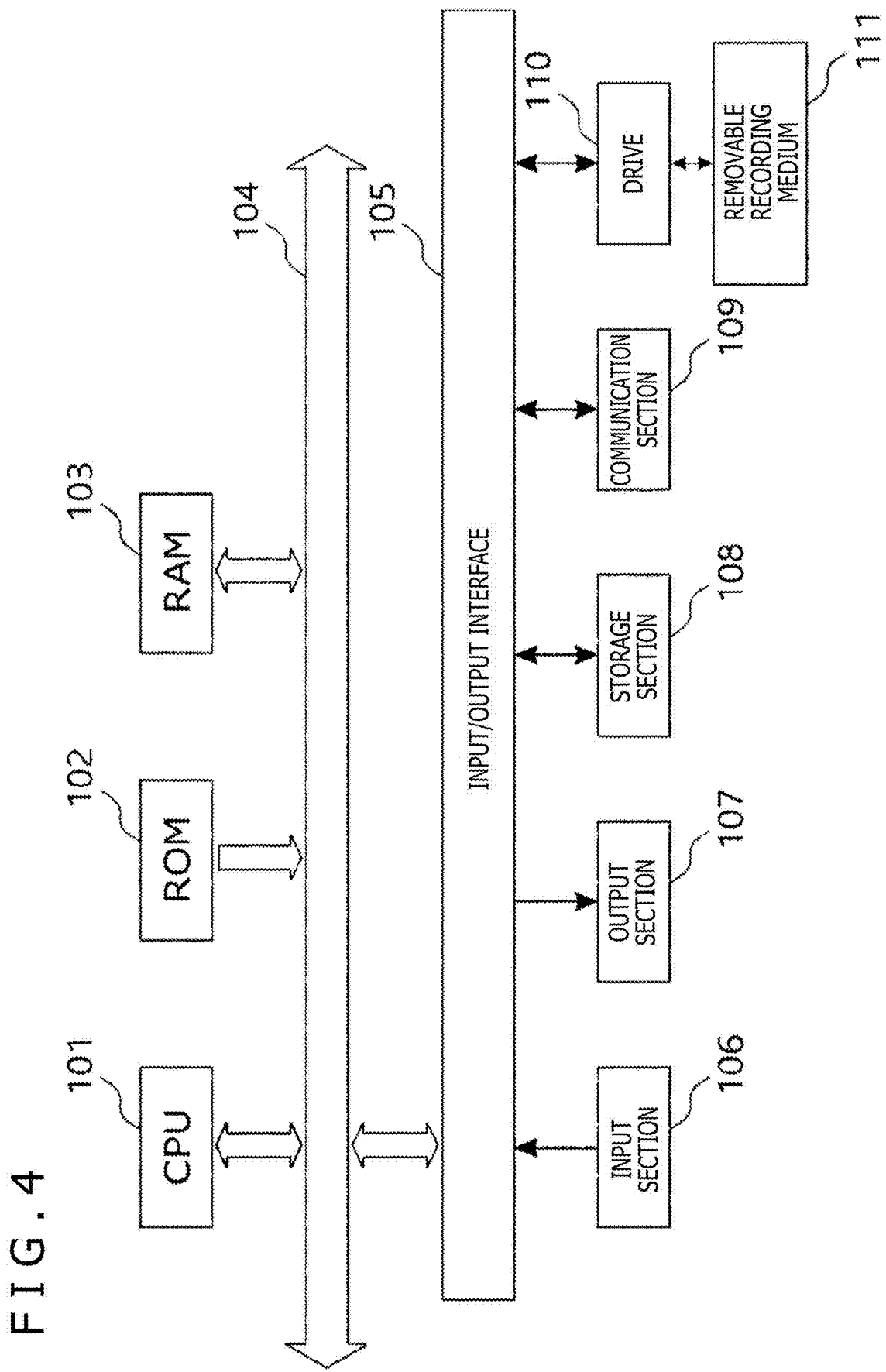

INFORMATION PROCESSING DEVICE, INFORMATION PROCESSING METHOD, AND PROGRAM

CROSS REFERENCE TO PRIOR APPLICATION

This application is a National Stage Patent Application of PCT International Patent Application No. PCT/JP2019/004790 (filed on Feb. 12, 2019) under 35 U.S.C. § 371, which claims priority to Japanese Patent Application No. 2018-032150 (filed on Feb. 26, 2018), which are all hereby incorporated by reference in their entirety.

TECHNICAL FIELD

The present technology relates to an information processing device, an information processing method, and a program, and more particularly to an information processing device, an information processing method, and a program that make it possible to provide proper exposure control of a captured image.

BACKGROUND ART

In some cases, exposure control of cameras capturing an image for purposes of viewing (appreciation) is exercised such that the light intensity of a whole image becomes a specified value, or that the light intensity of a specific area of an image (where a human or other important imaging object is empirically likely to be imaged) becomes a specified value. A method disclosed, for example, in PTL 1 divides an imaging area into a plurality of small areas, selects a specific area from the small areas, and exercises exposure control in accordance with the brightness value of the selected specific area.

CITATION LIST

Patent Literature

[PTL 1]
Japanese Patent Laid-open No. 2007-74163

SUMMARY

Technical Problem

In recent years, there are an increasing number cases where unique exposure control is provided for special-purpose cameras such as industrial cameras, surveillance cameras, and vehicle-mounted cameras. Cameras are mounted in automobiles, autonomous mobile robots, drones, and other mobile bodies subjected to autonomous mobile control, and self-location estimation (self-localization) is achieved based on images captured by the cameras. When a camera is mounted, for example, in a drone or other device that freely moves in a three-dimensional space, there are an enormous number of variations of imaging objects and their imaging styles. Therefore, when exposure control is exercised based on the light intensity of a specific area, the exposure of an imaging object important for imaging purposes cannot be controlled. This causes a problem where the imaging object cannot be tracked.

The present technology has been made in view of the above circumstances, and makes it possible to provide proper exposure control of a captured image in a case where the captured image is used, for example, to perform location estimation.

Solution to Problem

According to an aspect of the present technology, there is provided an information processing device including a matching section and a control section. The matching section matches a feature point extracted from a captured image against a registered feature point stored in a predetermined storage section, and extracts a corresponding feature point in the captured image that corresponds to the registered feature point. The control section sets an exposure control value in accordance with an area image that is an image of an area near the corresponding feature point in the captured image.

According to an aspect of the present technology, there is provided an information processing method that is performed by an information processing device. The information processing method includes the steps of: matching a feature point extracted from a captured image against a registered feature point stored in a predetermined storage section, and extracting a corresponding feature point in the captured image that corresponds to the registered feature point; and setting an exposure control value in accordance with an area image that is an image of an area near the corresponding feature point in the captured image.

According to an aspect of the present technology, there is provided a program that causes a computer to function as a matching section and a control section. The matching section matches a feature point extracted from a captured image against a registered feature point stored in a predetermined storage section, and extracts a corresponding feature point in the captured image that corresponds to the registered feature point. The control section sets an exposure control value in accordance with an area image that is an image of an area near the corresponding feature point in the captured image.

An aspect of the present technology matches a feature point extracted from a captured image against a registered feature point stored in a predetermined storage section, extracts a corresponding feature point in the captured image that corresponds to the registered feature point, and sets an exposure control value in accordance with an area image that is the image of an area near the corresponding feature point in the captured image.

It should be noted that the information processing device according to an aspect of the present technology can be implemented by causing a computer to execute a program. Further, the program to be executed by a computer in order to implement the information processing device according to an aspect of the present technology can be supplied by being transmitted through a transmission medium or by recorded on a recording medium.

The information processing device may be an independent device or an internal block included in a device.

Advantageous Effect of Invention

An aspect of the present technology makes it possible to provide proper exposure control of a captured image.

It should be noted that the advantages described here are not always restrictive. The present technology may provide any advantages described in the present disclosure.

BRIEF DESCRIPTION OF DRAWINGS

FIG. 3 is a flowchart illustrating an exposure control process performed by the exposure control device.

FIG. 4 is a block diagram illustrating a configuration example of an embodiment of a computer to which the present technology is applied.

DESCRIPTION OF EMBODIMENT

A mode for implementing the present technology (hereinafter referred to as an embodiment) will now be described. The description will be given in the following order.
1. Configuration Example of Exposure Control Device
2. Flowchart of Exposure Control Process
3. Modified Examples
4. Computer Configuration Example

1. Configuration Example of Exposure Control Device

Figure 1:
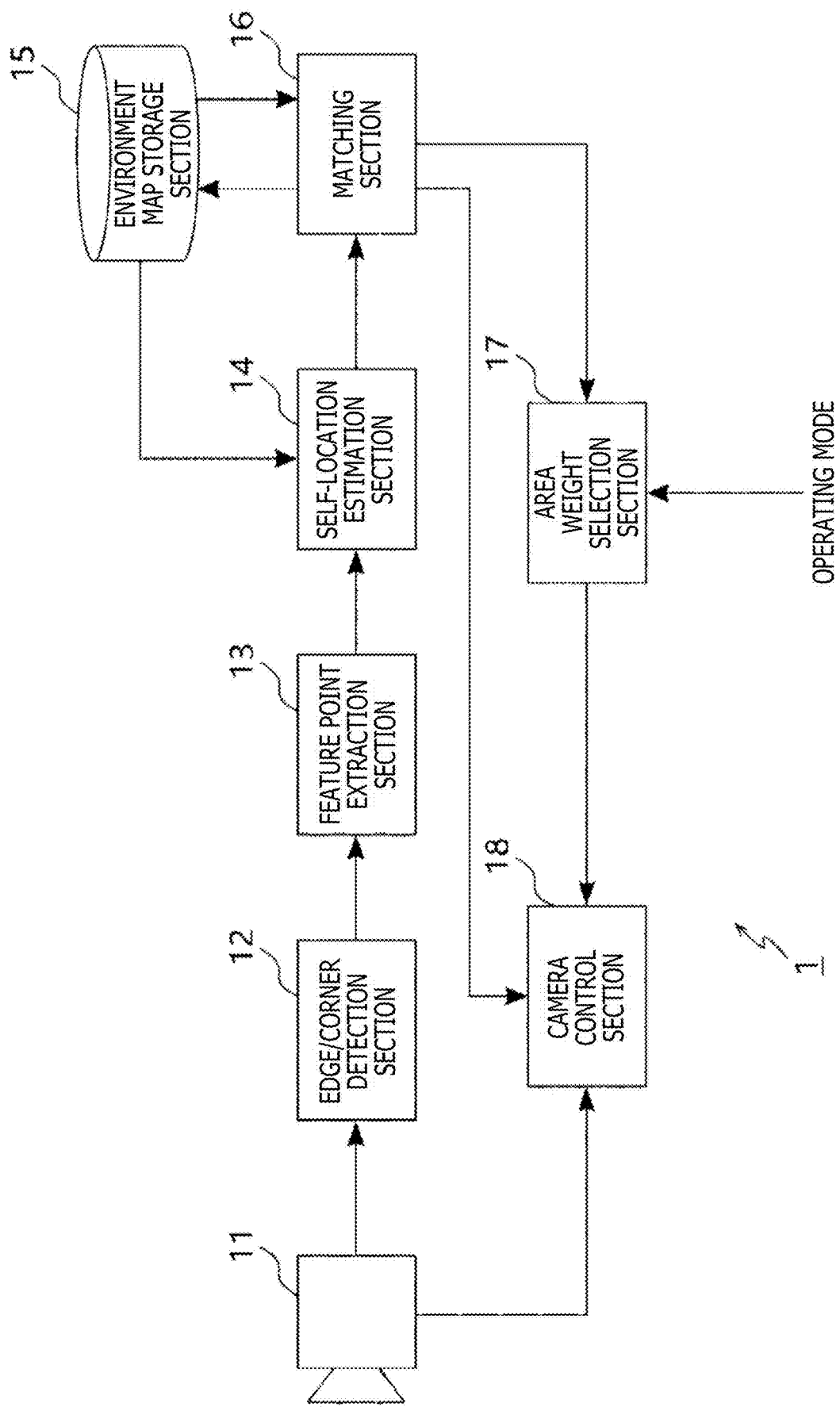
FIG. 1 is a block diagram illustrating a configuration example of an exposure control device according to an embodiment of an information processing device to which the present technology is applied.

FIG. 1 is a block diagram illustrating a configuration example of an exposure control device according to an embodiment of an information processing device to which the present technology is applied.

An exposure control device 1 depicted in FIG. 1 includes a camera 11, an edge/corner detection section 12, a feature point extraction section 13, a self-location estimation section 14, an environment map storage section 15, a matching section 16, an area weight selection section 17, and a camera control section 18, and provides exposure control of the camera 11 in accordance with an image captured by the camera 11.

The exposure control device 1 is incorporated, for example, in an automobile, an autonomous mobile robot, a drone, or other mobile body subjected to autonomous mobile control.

It should be noted that the camera 11 is included as a part of the exposure control device 1. However, the camera 11 may alternatively be disposed separately from the exposure control device 1.

The camera 11 includes, for example, a CCD (Charge Coupled Device) sensor, a CMOS (Complementary Metal Oxide Semiconductor) sensor, or other imaging element, a mechanical shutter, and one or more lenses, captures an image of an imaging object at a predetermined frame rate, and supplies the resultant image (captured image) to the edge/corner detection section 12. The camera 11 includes, for example, a stereo camera or a TOT (Time Of Slight) camera, and is able to detect the three-dimensional location of each pixel in the captured image.

In the camera 11, exposure is adjusted under the control of the camera control section 18. For example when capturing an image, the camera 11 changes its shutter period and gain in accordance with a control sign 1 supplied from the camera control section 18. It should be noted that the shutter period may be the period of a mechanical shutter or an electronic shutter.

The edge/corner detection section 12 detects at least an edge or corner of the captured image supplied from the camera 11, and supplies the result of detection and the captured image to the feature point extraction section 13. Any known method can be adopted for edge/corner detection.

The feature point extraction section 13 extracts a feature point in the captured image by using the result of edge or corner detection, which is supped from the edge/corner detection section 12. Any known method, such as the Harris corner, SHIFT, SURF, or FAST method, may be used for feature point extraction. The feature point extraction section 13 supplies the captured image and the extracted feature point in the captured image to the self-location estimation section 14.

By using the feature point in the captured image, which is supplied from the feature point extraction section 13, the self-location estimation section 14 performs Visual-SLAM (Simultaneous Localization and Mapping) to estimate the location (self-location) and posture of a mobile body in which the exposure control device 1 is incorporated. More specifically the self-location estimation section 14 estimates the self-location and posture of the mobile body in accordance with the feature point relationship between the captured image of a current frame currently supplied from the feature point extraction section 13 and a captured image of a previous frame previously supplied from the feature point extraction section 13. Further, in a case inhere the self-location estimation section 14 has failed in motion tracking of the captured image and thus failed in self-location estimation based on the feature point relationship between the captured image of the previous frame and the captured image of the current frame, the self-location estimation section 14 tracks the captured image of the current frame by referencing key frame information regarding the previously captured image, which is stored in the environment map storage section 15, and resumes self-location estimation (relocalization). Furthermore, even in a case where the self-location estimation section 14 has not failed in self-location estimation, the self-location estimation section 14 may be able to improve the accuracy of self-location estimation by referencing the result of self-location estimation based on an environment map in the environment map storage section 15.

Moreover, in a case where a gyro sensor, an acceleration sensor, a magnetometric sensor, a pressure sensor, or other inertial measurement sensor is included in the exposure control device 1 or the mobile body in which the exposure control device 1 is incorporated, the self-location estimation section 14 is able to accurately estimate the self-location and posture by additional using information obtained from such an inertial measurement sensor.

Here, a previously captured image used to generate the key frame information stored is the environment map storage section 15 is referred to as a registered image in order to distinguish it from sequentially captured images acquired from the camera 11.

The environment man storage section 15 stores an environment map that is, for example, the key frame information regarding each of a plurality of registered images captured beforehand on a probable travel route of a mobile body. One piece of key frame information includes at least three-dimensional location information (x, y, z) regarding one feature point included in the registered image and an image of a predetermined area near the feature point (this image is hereinafter referred to as a patch image).

Figure 2:
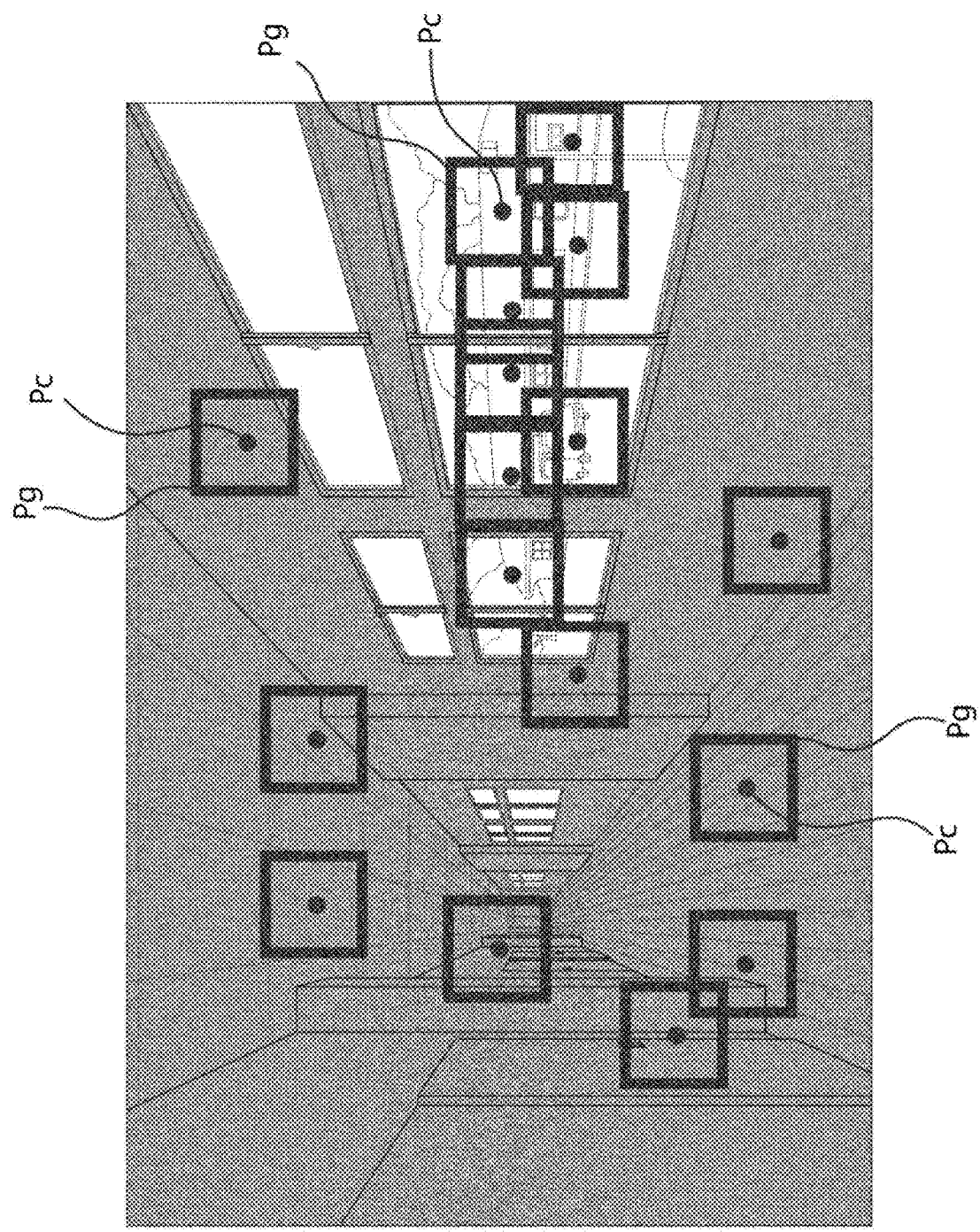
FIG. 2 is a diagram illustrating key frame information.

FIG. 2 illustrates, as an example, a plurality of feature points Pc extracted from one registered image and patch images Pg of areas near the feature points Pc. It should be noted that the symbols of some of the feature points PC and patch images Pg are omitted from FIG. 2 in order to prevent. FIG. 2 from becoming complicated. One piece of key frame information includes, as indicated in FIG. 2, the three-dimensional location information (x, y, z) regarding one or more feature points Pc extracted from each registered image and the patch images Pg of areas near the feature points Pc.

It should be noted that one piece of key frame information to be stored may additionally include at least one of semantic information regarding a feature point, the priority level of the feature point, image capture time when a registered mage of the feature point is captured, or camera location information. The semantic information regarding the feature point is information defining the meaning of the feature point, such as "floor," "desk," or "curtain."

A feature point included in the key frame information is referred to as a registered feature point in order to distinguish it from a feature point extracted from a captured image. As a plurality of registered feature points is extracted for one registered image, the environment map storage section 15 stores a plurality of pieces of key frame information for one registered image. However, the environment map storage section 15 stores a plurality of pieces of key frame information extracted from each registered image on the basis of individual registered images, and does not store registered images themselves.

It should be noted that the present embodiment does not refer to any specific method of generating the key frame information to be stored in the environment map storage section 15. However, the key frame information may be generated by the exposure control device 1 itself or downloaded, for example, from a cloud server. In a case where the key frame information is to be generated by the exposure control device 1 itself, the matching section 16, for example performs a process of generating the key frame information from the registered images.

The matching section 16 receives, from the self-location estimation section 14, a captured image of the current frame and feature point information regarding one or more feature points, which is extracted from the captured image.

The matching section 16 matches one or more feature points in the captured image of the current frame against the registered feature points included in the key frame information stored in the environment map storage section 15 on the basis of individual registered images, and thus selects one or more pieces of key frame information corresponding to a predetermined registered image stored in the environment map storage section 15. For example, the matching section 16 matches one or more feature points in the captured image of the current frame against the registered feature points included in the key frame information on the basis of individual registered images by using, for example, the DBoW (Distributed Bag of Words) method, identifies the most correlated registered image (the most highly scored image), and selects the key frame information regarding the most correlated registered image. The DBoW method is disclosed, for example, in "Bags of binary words for fast place recognition in image sequences," IEEE 2012. It should be noted that the method of matching is not limited to the DBoW method. For example, a neural network may be used to match one or more feature points in the captured image of the current frame against the registered feature points included in the key frame information.

Further, for each registered feature point that is selected as matching a feature point in the captured image of the current frame and included in one or more pieces of key frame information regarding a predetermined registered image, the matching section 16 extracts a feature point in the captured image of the current frame that corresponds to a registered feature point. For example, the matching section 16 identifies the correlation between the registered feature point and the feature point in the captured image of the current frame by using, for instance, the Euclidean distance between the feature points, determines a pair of the registered feature point and the feature point in the captured image of the current frame that provides the maximum correlation, and extracts the feature point in the captured image of the current frame that corresponds to the registered feature point. As a result, for one or more registered feature points included in the captured image of the current frame, a registered feature point and a feature point in the captured image of the current frame are associated with each other on a one-to-one basis. A feature point in the current frame that corresponds to a registered feature point is hereinafter referred to as a corresponding feature point.

The matching section 16 supplies the captured image and the key frame information corresponding to the extracted corresponding feature point to the area weight selection section 17.

It should be noted that, in a case where the number of extracted corresponding feature points is equal to or smaller than a predetermined value, that is, the number of corresponding feature points in the captured image of the current frame is small so that no registered image stored in the environment map storage section 15 is determined to be matched, the matching section 16 does not exercise exposure control based on the environment map, but supplies, to the camera control section 18, a control signal for switching to different exposure control such as full screen exposure control based on the average brightness value of all pixels in the captured image. This enables the camera control section 18 to change the method of exposure control by switching from exposure control based on the environment map to full screen exposure control.

Based on the key frame information supplied from the matching section 16, the area weight selection section 17 selects an area image that is the image of an area near the corresponding feature point in the captured image of the current frame. The area image corresponds to the patch image of the captured image of the current frame, which corresponds to the patch image in the key frame information. As a stain corresponding feature points exist in the captured image of the current frame, a plurality of area images is to be selected.

Further, the area weight selection section 17 sets a weight for each area image selected from the captured image of the current frame. The weight for each area image may be determined based, for example, on the distance between the camera 11 and a corresponding feature point. The corresponding feature point positioned near the camera 11 moves a relatively long distance over a camera image. Therefore, it is known that self-location estimation becomes more accurate when a feature point positioned closer to the camera is relied on. Accordingly, the area weight selection section 17 is able to set a great weight for an area image of a location near the camera 11.

Furthermore, as the key trace information, the environment map storage section 15 stores the semantic information regarding a feature point. Therefore, in a case where an operating mode is specified for the area weight selection section 17, for example, by a control section of the mobile body in which the exposure control device is incorporated, the area weight selection section 17 is able to determine the weight for each area image in accordance with the semantic information. For example, a "floor-oriented mode," a "road-oriented mode," and a "signboard-oriented mode" are available as the operating mode. In a case where the "floor-oriented mode" is designated, the area weight selection section 17 is able to set a great weight for an area image depicting a "floor," which is the semantic information corresponding to the operating mode.

Meanwhile, in a case where the priority levels of feature points is stored as the key frame information in the environment map storage section 15, the area weight selection section 17 is able to determine the weight for each area image in accordance with the priority levels of the feature points included in the key frame information.

Moreover, the area weight selection section 17 may determine the weight for each area image by combining the above-mentioned weight elements, such as the distance between the camera 11 and the corresponding feature point, the semantic information regarding the corresponding feature point, and the priority level set for the corresponding feature point.

The area weight selection section 17 supplies each area image selected from the captured image of the current frame and the weight for each selected area image to the camera control section 18.

The camera control section 18 sets an exposure control value in accordance with each area image and weight supplied from the area weight selection section 17. More specifically, the camera control section 18 calculates the weighted average brightness of a plurality of area images supplied from the area weight selection section 17, and sets the exposure control value in accordance with the calculated weighted average brightness. The exposure control value is, for example, a parameter for controlling the gain and shutter period of the camera 11, and is determined in such a manner that the calculated weighted average brightness approaches a preset target value.

The camera control section 18 supplies, to the camera 11, a control signal corresponding to the exposure control value that is set based on each area image. Based on the exposure control value supplied from the camera control section 18, the camera 11 changes its gain or shutter period. It should be noted that, in a case where the exposure control device 1 is able to control a lighting device for illuminating an imaging object, the light intensity value of the lighting device may be controlled based on the calculated weighted average brightness. Further, in a case where, for instance, the gain, shutter, and illumination are to be simultaneously controlled, a plurality of lighting devices is to be controlled, or the camera 11 is able to vary the gain from one area to another, for example, a control signal may be supplied to a plurality of devices (e.g., camera 11 and lighting device) or control signals for a plurality of different exposure control values may be supplied.

2. Flowchart of Exposure Control Process

An exposure control process performed by the exposure control device 1 will now be described with reference to the flowchart of FIG. 3. This process starts when, for example, an image captured by the camera 11 is acquired.

First of all, in step S1, the edge/corner detection section 12 acquires a captured image supplied from the camera 11, and detects at least an edge or corner of the acquired captured image. Then, the edge/corner detection section 12 supplies the captured image and the result of edge or corner detection to the feature point extraction section 13.

In step S2, the feature point extraction section 13 extracts a feature point in the captured image by using the result of edge or corner detection, which is supplied from the edge/corner detection section 12. For example, the Harris corner, SHIFT, SURF, or FAST method may be used for feature point extraction. The feature point extraction section 13 supplies the captured image and the extracted feature point in the captured image to the self-location estimation section 14.

In step S3, by using the feature point in the captured image, which is supplied from the feature point extraction section 13, the self-location estimation section 14 performs Visual-SLAM to estimate the location (self-location) and posture of the mobile body in which the exposure control device 1 is incorporated. More specifically, the self-location estimation section 14 estimates the self location and posture of the mobile body in accordance with the feature point relationship between the captured image of a current frame currently supplied from the feature point extraction section 13 and a captured image of a previous frame previous supplied from the feature point extraction section 13. Further, in step S3, the self-location estimation section 14 supplies the captured image of the current frame and feature point information regarding one or more feature points to the matching section 16.

In step S4, the matching section 16 matches one or more feature points in the captured image of the current frame against the registered feature points in the key frame information stored in the environment map storage section 15, and selects one or more pieces of key frame information regarding a predetermined registered image stored in the environment map storage section 15.

In step S5, the matching section 16 extracts feature points (corresponding feature points) corresponding to the selected key frame information. More specifically, for each registered feature point that is selected as matching a feature point in the captured image of the current frame and included in one or more pieces of key frame information regarding the predetermined registered image, the matching section 16 extracts a feature point in the captured image of the current frame that corresponds to a registered feature point.

Then, in step S6, the matching section 16 determines whether the number of extracted corresponding feature points is greater than a predetermined value.

In a case where the number of extracted corresponding feature points is determined in step S6 to be larger than the predetermined value, processing proceeds to step S7. In step S7, the matching section 16 supplies, to the area weight selection section 17, the captured image and the key frame information corresponding to the extracted corresponding feature points.

In step S8, based on the key frame information supplied from the matching section 16, the area weight selection section 17 selects area images that are the images of areas near the corresponding feature points in the captured image of the current frame.

In step S9, the area weight selection section 17 sets a weight for each area image selected from the captured image of the current frame. The weight for each area image is set based, for example, on the distance between the camera 11 and a corresponding feature point, the semantic information regarding the corresponding feature point, or the priority level set for the corresponding feature point. The area weight selection section 17 supplies each area image selected from the captured image of the current frame and the weight for each selected area image to the camera control section 18.

In step S10, the camera control section 18 sets an exposure control value in accordance with each area image and weight supplied from the area weight selection section 17. More specifically, the camera control section 18 calculates the weighted average brightness of a plurality of area images supplied from the area weight selection section 17, and determines the exposure control value in such a manner that the calculated weighted average brightness approaches the preset target value. The determined exposure control value is supplied to the camera 11 so that the gain or the shutter period is changed based on the exposure control value.

Meanwhile, in a case where the number of extracted corresponding feature points is determined in step S6 to be equal to or smaller than the predetermined value, processing proceeds to step S11. In step S11, the matching section 16 supplies, to the camera control section 18, the captured image of the current frame and a control signal for switching to full screen exposure control based on the brightness values of all pixels in the captured image. The camera control section 18 changes the exposure control method by switching from exposure control based on the environment map to full screen exposure control, calculates the average brightness value of all pixels in the captured image, and determines the exposure control value in accordance with the calculated average brightness value. The determined exposure control value is supplied to the camera 11 so that the gain or the shutter period is changed based on the exposure control value.

In step S12, the camera control section 18 determines whether or not to terminate the exposure control process. For example, in a case where a command for terminating an image capture operation of the camera 11 is supplied from the control section of the mobile body in which the exposure control device 1 is incorporated, the camera control section 18 determines to terminate the exposure control process.

In a case where the camera control section 18 determines in step S12 not to terminate the exposure control process yet, processing returns to step S1 so that steps S1 to S12 are repeated in a manner described above. More specifically, the next captured image supplied from the camera 11 is regarded as the captured image of the current frame and subjected to the above-described exposure control process.

Meanwhile, in a case here the camera control section 18 determines in step S12 to terminate the exposure control process, the exposure control process terminates.

The exposure control process performed by the exposure control device 1 is as described above.

3. Modified Examples

Modified examples of the exposure control process will now be described.

In a case where the above-described exposure control process selects one or more pieces of key frame information regarding a predetermined registered image matching a feature point included in the captured image of the current frame, the matching section 16 performs matching against the whole key frame information stored in the environment map storage section 15.

However, in a case where the camera location information regarding the capture of a registered image at the time of key frame information generation is stored in the environment map storage section 15 as part of the key frame information, the matching section 16 may acquire the location of the mobile body (camera 11), which is calculated by the self-location estimation section 14, from the self-location estimation section 14, and search for and select key frame information that is stored in the environment map storage section 15 and includes camera location information regarding a camera location within a predetermined range from the location of the mobile body (camera 11).

Meanwhile, in a case where the image capture time when a registered image is captured for key frame information generation is stored in the environment map storage section 15 as part of the key frame information, the matching section 16 may search for and select key frame information that is stored in the environment map storage section 15 and includes key frame information regarding the current time, that is, a time close to the time of capture of the captured image of the current frame (a time within a predetermined length of time from the current time).

When a target for searching for the key frame information stored in the environment map storage section 15 as described above is selected based, for example, on camera location information or image capture time information in order to perform matching by using selected key frame information, it is possible not only to prevent erroneous detection at the time of matching, but also to reduce required calculation cost.

Further, in the above-described exposure control process, the camera control section 18 calculates the weighted average brightness of a plurality of area images, and determines the exposure control value in such a manner that the calculated weighted average brightness approaches the preset target value.

In a case here the keyframe information stored in the environment map storage section 15 is generated from a registered image subjected to proper exposure control, an alternative is to determine the exposure control value in such a manner as to adjust the exposure control value for the key frame information.

In the above case, the area weight selection section 17 supplies, to the camera control section 18, not only each area image and weighted selected from the captured image of the current image, but also the key frame information supplied from the matching section 16. The camera control section 18 calculates, on the basis of individual area images, the value of average brightness difference between a patch image in the key frame information and an area image corresponding to the patch image, and further calculates a weighted average difference value that is weighted based on the weight for the area image. Then, the camera control section 18 sets the exposure control value in accordance with the calculated weighted average difference value.

When a drone or other mobile body moving in a free posture within a three-dimensional space is used to capture images for Visual-SLAM, the locations of pixels depicting a bright place or a dark place vary from one image to another. Therefore, in order to cope with such situation, it is necessary to decide on a pixel location targeted for exposure adjustment by exercising a certain recognition function. However, freely moving mobile bodies cannot incorporate all recognizers for image capture operations. In addition, pre-storing whole image information is not practical.

For self-location estimation based on Visual-SLAM, the key frame information, which is three-dimensional information regarding feature points, is prepared beforehand for relocalization.

According to the above-described exposure control process performed by the exposure control device 1, when the key frame information is stored as the environment map in the environment map storage section 15 in preparation for a case where the self-location estimation section 14 fails in motion tracking based on an image, and is additionally used for exposure control, a space can be accurately recognized so as to provide proper exposure control.

The key frame information in the environment map storage section 15, which is used for self-location estimation, may be use as is. An alternative is to add, as mentioned earlier, the minimum necessary information such as the priority level of a feature point, the semantic information, and the camera location information. As the key frame information originally used for self location estimation is utilized, highly accurate exposure control can be achieved at a low load even if the information necessary for exposure control is added.

As far as an image capture operation is performed beforehand to store the key frame information regarding a registered image in the environment map storage section 15, proper exposure control can be exercised even at a place where a plurality of bright and dark areas exists to make exposure control difficult.

The above-described exposure control process is particularly effective for camera exposure control of a drone or other mobile body moving in a free posture within a three-dimensional space and for camera exposure control in an environment where dramatic brightness changes occur due, for instance, to an outdoor-to-indoor movement (or reverse movement).

4. Computer Configuration Example

The above-described series of processes can be performed by hardware or software. In a case where the series of processes is to be performed by software, a program including the software is installed on a computer. Here, the computer may be, for example, a microcomputer incorporated in dedicated hardware or a general-purpose personal computer or other computer capable of performing various functions when various programs are installed on the computer.

FIG. 4 is a block diagram illustrating an example of a hardware configuration of the computer that performs the above-described exposure control process by executing a program.

In the computer, a CPU (Central Processing Unit) 101, a ROM (Read Only Memory) 102, and a RAM (Random Access Memory) 103 are interconnected by a bus 104.

The bus 104 is further connected to an input/output interface 105. The input/output interface 105 is connected to an input section 106, an output section 107, a storage section 108, a communication section 109, and a drive 110.

The input section 106 includes, for example, a keyboard, a mouse, a microphone, a touch panel, and an input terminal. The output section 107 includes, for example, a display, a speaker, and as output terminal. The storage section 108 includes, for example, a hard disk, a RAM disk, and a nonvolatile memory. The communication section 109 includes, for example, a network interface. The drive 110 drives a removable recording medium 111 such as a magnetic disk, an optical disk, a magneto-optical disk, or a semiconductor memory.

The computer configured as described above performs the above-described exposure control process by allowing the CPU 101, for example, to load a program stored in the storage section 108 into the RAM 103 through the input/output interface 105 and the bus 104, and execute the loaded program. The RAM 103 also stores, as appropriate, for example, data necessary for allowing the CPU 101 to perform various processes.

The computer is configured such that the program can be installed in the storage section 108 through the input/output interface by inserting the removable recording medium 111 into the drive 110. Further, the program can be received by the communication section 109 through a wired or wireless transmission medium, such as a local area network, the Internet, or a digital satellite broadcast, and installed in the storage section 108. Moreover, the program can be preinstalled in the ROM 102 or the storage section 108.

It should be noted that the steps depicted in the flowchart in this document may be performed in a described chronological order. However, the depicted steps need not always be performed in a chronological order. Alternatively, the depicted steps may performed in a parallel manner or at required time points when, for example, they are called.

The embodiments of the present technology are not limited to those described above, and may be variously modified without departing from the spirit of the present technology.

For example, it is possible to adopt an alternative embodiment that is obtained by combining all or some of the above-described embodiments.

For example, the present technology may be configured for cloud computing in which one function is shared by a plurality of devices through a network in order to perform processing in a collaborative manner.

Further, each step described with reference to the above-mentioned flowchart may be not only performed by one device but also performed in a shared manner by a plurality of devices.

Moreover, in a case where a plurality of processes is included in a single step, the plurality of processes included in such a single step may be not only performed by one device but also performed in a shared manner by a plurality of devices.

It should be noted that the advantages described in this document are merely illustrative and not restrictive. The present technology may also provide advantages other than those described in this document.

The present technology may additionally adopt the following configurations.

(1)

An information processing device including:

a matching section that matches a feature point extracted from a captured image against a registered feature point stored in a predetermined storage section, and extracts a corresponding feature point in the captured image that corresponds to the registered feature point; and a control section that sets an exposure control value in accordance with an area image, the area image being an image of an area near the corresponding feature point in the captured image.

(2)

The information processing device according to (1) further including:

an area weight selection section that selects the area image of the captured image that corresponds to each of a plurality of the registered feature points stored in the storage section, and sets a weight for the selected plurality of the area images, in which the control section calculates a weighted average brightness of a plurality of the area images, and sets the exposure control value in accordance with the weighted average brightness.

(3)

The information processing device according to (2), in which the area weight selection section sets a great weight for the area image of a location near a camera used to acquire the captured image.

(4)

The information processing device according to any one of (1) to (3), in which the storage section stores, as key frame information, three-dimensional location information regarding the registered feature point included in a registered image captured beforehand, and a patch image that is an image of an area near the registered feature point.

(5)

The information processing device according to (2), in which the storage section stores, as key frame information, three-dimensional location information regarding the registered feature point included in a registered image captured beforehand, a patch image that is an image of an area near the registered feature point, and semantic information regarding the registered feature point, and in which the area weight selection section sets a weight for the area image in accordance with the semantic information.

(6)

The information processing device according to (5), in which the area weight selection section sets a great weight for the area image having the semantic information corresponding to an operating mode.

(7)

The information processing device according to (2), in which the storage section stores, as key frame information, three-dimensional location information regarding the registered feature point included in a registered image captured beforehand, a patch image that is an image of an area near the registered feature point, and a priority level of the registered feature point, and in which the area weight selection sets a weight for the area image in accordance with the priority level.

(8)

The information processing device according to (1), in which the storage section stores, as key frame information, three-dimensional location information regarding the registered feature point included in a registered image captured beforehand, and a patch image that is an image of an area near the registered feature point, and in which the control section calculates a weighted average difference value and sets an exposure control value in accordance with the weighted average difference value, the weighed average difference value being obtained by weighting, in accordance with a weight for the area image, a value of average brightness difference between the patch image of the registered feature point in the key frame information and the area image of the corresponding feature point in the captured image.

(9)

The information processing device according to any one of (1) to (8), in which the storage section stores, as key frame information, three-dimensional location information regarding the registered feature point included in a registered image captured beforehand, a patch image that is an image of an area near the registered feature point, and image capture location information indicative of a location where the registered image is captured beforehand, and in which the matching section selects the key frame information stored in the storage section in accordance with the image capture location information, performs matching against the registered feature point in the selected key frame information, and extracts the corresponding feature point in the captured image.

(10)

The information processing device according to any one of (1) to (8), in which the storage section stores, as key frame information, three-dimensional location information regarding the registered feature point included in a registered image captured beforehand, a patch image that is an image of an area near the registered feature point, and image capture time information indicative of a time when the registered image is captured beforehand, and in which the matching section selects the key frame information stored in the storage section in accordance with the image capture time in performs matching against the registered feature point in the selected key frame information and extracts the corresponding feature point in the captured image.

(11)

An information processing method that is performed by an information processing device, the information processing method including:

matching a feature point extracted from a captured image against a registered feature point stored in a predetermined storage section, and extracting a corresponding feature point in the captured image that corresponds to the registered feature point; and setting an exposure control value in accordance with an area image that is an image of an area near the corresponding feature point, in the captured image.

(12)

A program that causes a computer to function as:

a matching section that matches a feature point extracted from a captured image against a registered feature point stored in a predetermined storage section, and extracts a corresponding feature point in the captured image that corresponds to the registered feature point; and a control section that sets an exposure control value in accordance with an area image that is an image of an area near the corresponding feature point in the captured image.

REFERENCE SIGNS LIST

1 Exposure control device, 11 Camera, 14 Self-location estimation section, 15 Environment map storage section, 16 Matching section, 17 Area weight selection section, 18 Camera control section, 101 CPU, 102 ROM, 103 RAM, 106 Ingot section, 107 Output section, 108 Storage section, 109 Communication section, 110 Drive

The invention claimed is:

1. An information processing device comprising:
a matching section configured to
match a feature point extracted from a captured image against a registered feature point stored in a predetermined storage section, and
extract a corresponding feature point in the captured image that corresponds to the registered feature point;
a control section configured to set an exposure control value in accordance with each area image of a plurality of area images, each area image being an image of an area near the corresponding feature point in the captured image; and
an area weight selection section configured to select the plurality of area images of the captured image that correspond to each of a plurality of registered feature points stored in the storage section,
wherein the matching section, the control section, and the area weight selection section are each implemented via at least one processor, and
wherein the storage section is implemented via at least one non-transitory computer-readable storage medium.

2. The information processing device according to claim 1,
 wherein the area weight selection section is further configured to set a weight for each area image of the selected plurality of the area images, and
 wherein the control section is further configured to
  calculate a weighted average brightness of a plurality of the area images, and
  set the exposure control value in accordance with the weighted average brightness.

3. The information processing device according to claim 2,
 wherein the area weight selection section sets a great weight for the area image of a location near a camera used to acquire the captured image.

4. The information processing device according to claim 1,
 wherein the storage section stores, as key frame information, three-dimensional location information regarding the registered feature point included in a registered image captured beforehand, and a patch image that is an image of an area near the registered feature point.

5. The information processing device according to claim 2,
 wherein the storage section stores, as key frame information, three-dimensional location information regarding the registered feature point included in a registered image captured beforehand, a patch image that is an image of an area near the registered feature point, and semantic information regarding the registered feature point, and
 wherein the area weight selection section sets a weight for the area image in accordance with the semantic information.

6. The information processing device according to claim 5,
 wherein the area weight selection section sets a great weight for the area image having the semantic information corresponding to an operating mode.

7. The information processing device according to claim 2,
 wherein the storage section stores, as key frame information, three-dimensional location information regarding the registered feature point included in a registered image captured beforehand, a patch image that is an image of an area near the registered feature point, and a priority level of the registered feature point, and
 wherein the area weight selection section sets a weight for the area image in accordance with the priority level.

8. The information processing device according to claim 1,
 wherein the storage section stores, as key frame information, three-dimensional location information regarding the registered feature point included in a registered image captured beforehand, and a patch image that is an image of an area near the registered feature point, and
 wherein the control section calculates a weighted average difference value and sets an exposure control value in accordance with the weighted average difference value, the weighted average difference value being obtained by weighting, in accordance with a weight for the area image, a value of average brightness difference between the patch image of the registered feature point in the key frame information and the area image of the corresponding feature point in the captured image.

9. The information processing device according to claim 1,
 wherein the storage section stores, as key frame information, three-dimensional location information regarding the registered feature point included in a registered image captured beforehand, a patch image that is an image of an area near the registered feature point, and image capture location information indicative of a location where the registered image is captured beforehand, and
 wherein the matching section selects the key frame information stored in the storage section in accordance with the image capture location information, performs matching against the registered feature point in the selected key frame information, and extracts the corresponding feature point in the captured image.

10. The information processing device according to claim 1,
 wherein the storage section stores, as key frame information, three-dimensional location information regarding the registered feature point included in a registered image captured beforehand, a patch image that is an image of an area near the registered feature point, and image capture time information indicative of a time when the registered image is captured beforehand, and
 wherein the matching section selects the key frame information stored in the storage section in accordance with the image capture time information, performs matching against the registered feature point in the selected key frame information, and extracts the corresponding feature point in the captured image.

11. An information processing method that is performed by an information processing device, the information processing method comprising:
 matching a feature point extracted from a captured image against a registered feature point stored in a predetermined storage section, and extracting a corresponding feature point in the captured image that corresponds to the registered feature point;
 setting an exposure control value in accordance with each area image of a plurality of area images, each area image being an image of an area near the corresponding feature point in the captured image; and
 selecting the plurality of area images of the captured image that correspond to each of a plurality of registered feature points stored in the storage section,
 wherein the storage section is implemented via at least one non-transitory computer-readable storage medium.

12. A non-transitory computer-readable storage medium having embodied thereon a program, which when executed by a computer causes the computer to execute a method, the method comprising:
 matching a feature point extracted from a captured image against a registered feature point stored in a predetermined storage section, and extracts a corresponding feature point in the captured image that corresponds to the registered feature point;
 setting an exposure control value in accordance with each area image of a plurality of area images, each area image being an image of an area near the corresponding feature point in the captured image; and
 selecting the plurality of area images of the captured image that correspond to each of a plurality of registered feature points stored in the storage section, wherein the storage section is implemented via at least one non-transitory computer-readable storage medium.

* * * * *